US010619496B2

(12) United States Patent
Porter et al.

(10) Patent No.: US 10,619,496 B2
(45) Date of Patent: Apr. 14, 2020

(54) TURBINE VANE WITH VARIABLE TRAILING EDGE INNER RADIUS (71) Applicant: UNITED TECHNOLOGIES CORPORATION, Hartford, CT (US)

(72) Inventors: Steven D. Porter, Wethersfield, CT (US); John T. Ols, Northborough, MA (US)

(73) Assignee: United Technologies Corporation, Farmington, CT (US)

(*) Notice: Subject to any disclaimer, the term of this patent is extended or adjusted under 35 U.S.C. 154(b) by 766 days.

(21) Appl. No.: 14/787,490

(22) PCT Filed: May 20, 2014

(86) PCT No.: PCT/US2014/038748
§ 371 (c)(1),
(2) Date: Oct. 28, 2015

(87) PCT Pub. No.: WO2014/200673
PCT Pub. Date: Dec. 18, 2014

(65) Prior Publication Data
US 2016/0069197 A1   Mar. 10, 2016

Related U.S. Application Data (60) Provisional application No. 61/835,015, filed on Jun. 14, 2013.

(51) Int. Cl.
F01D 5/14   (2006.01)
F01D 9/02   (2006.01)
(Continued)

(52) U.S. Cl.
CPC ............ F01D 9/023 (2013.01); F01D 5/141 (2013.01); F01D 5/18 (2013.01); F01D 9/047 (2013.01);
(Continued)

(58) Field of Classification Search
None
See application file for complete search history.

(56) References Cited

U.S. PATENT DOCUMENTS 4,365,933 A   12/1982 Langer et al.
4,511,306 A   4/1985 Hultgren
(Continued)

FOREIGN PATENT DOCUMENTS

WO   2010051110 A2   5/2010

OTHER PUBLICATIONS

Supplementary European Search Report for European Application No. 14811694.0 dated Dec. 23, 2016.
(Continued)

Primary Examiner — Moshe Wilensky
Assistant Examiner — Theodore C Ribadeneyra
(74) Attorney, Agent, or Firm — Carlson, Gaskey & Olds, P.C.

(57) ABSTRACT

A turbine vane has an airfoil extending between an inner platform and an outer platform. The airfoil is hollow. A hollow within the airfoil extends between an inner leading edge to an inner trailing edge. An inner radius is defined at the inner trailing edge in a circumferential direction measured between walls which extend from the inner leading edge to the inner trailing edge. The inner radius varies along a radial length defined between the inner and outer platforms. A mid-turbine frame and a gas turbine engine are also disclosed.

23 Claims, 5 Drawing Sheets (51) Int. Cl.
*F01D 9/04* (2006.01)
*F01D 5/18* (2006.01)
*F01D 25/16* (2006.01)

(52) U.S. Cl.
CPC ...... *F01D 25/162* (2013.01); *F05D 2240/122* (2013.01); *Y02T 50/671* (2013.01); *Y02T 50/673* (2013.01); *Y02T 50/676* (2013.01)

(56) References Cited

U.S. PATENT DOCUMENTS

| | | | |
|---|---|---|---|
| 6,312,219 B1* | 11/2001 | Wood | F01D 5/005 415/191 |
| 6,371,725 B1 | 4/2002 | Manteiga et al. | |
| 8,424,313 B1 | 4/2013 | Praisner et al. | |
| 2003/0180147 A1 | 9/2003 | Bolms et al. | |
| 2006/0093470 A1 | 5/2006 | Bermond et al. | |
| 2009/0185903 A1 | 7/2009 | Beeck et al. | |
| 2011/0008163 A1 | 1/2011 | Prentice et al. | |
| 2011/0016875 A1 | 1/2011 | Tsypkaykin et al. | |
| 2011/0081239 A1* | 4/2011 | Durocher | F01D 9/044 415/208.2 |
| 2011/0164970 A1 | 7/2011 | Greim et al. | |
| 2013/0067930 A1 | 3/2013 | Paradis | |

OTHER PUBLICATIONS

International Search Report for PCT Application No. PCT/US2014/038914 dated Sep. 3, 2014.
International Preliminary Report on Patentability for International Application No. PCT/US2014/038748 dated Dec. 23, 2015.

* cited by examiner

TURBINE VANE WITH VARIABLE TRAILING EDGE INNER RADIUS

CROSS-REFERENCE TO RELATED APPLICATION

This application claims priority to U.S. Provisional Application No. 61/835,015, filed Jun. 14, 2013.

BACKGROUND

This application relates to a turbine vane wherein an inner radius varies along a radial direction.

Gas turbine engines are known and, typically, include a compressor delivering compressed air into a combustion section where it is mixed with fuel and ignited. Products of this combustion pass downstream over turbine rotors driving them to rotate. The turbine rotors are alternated with static vanes, which are utilized to properly direct the flow of the products of combustion to be in a desirable condition when it reaches a downstream turbine rotor.

One location where vanes have been utilized is in a mid-turbine frame which is positioned between a higher pressure turbine rotor and a lower pressure turbine rotor. The vanes typically include an airfoil outer periphery and are hollow. An inner radius of a trailing edge of the airfoil has generally been constant along a radial dimension of the vane. The inner radius is defined in a circumferential direction.

SUMMARY

In a featured embodiment, a turbine vane has an airfoil extending between an inner platform and an outer platform. The airfoil is hollow. A hollow within the airfoil extends between an inner leading edge to an inner trailing edge. An inner radius is defined at the inner trailing edge in a circumferential direction measured between walls which extend from the inner leading edge to the inner trailing edge. The inner radius varies along a radial length defined between the inner and outer platforms.

In another embodiment according to the previous embodiment, the inner radius is greater in at least one of the inner and the outer platforms than at smaller radius locations disposed in a region defined radially between the inner and outer platforms.

In another embodiment according to any of the previous embodiments, the inner radius is greater at both the inner and outer platforms than it is at the smaller radius locations.

In another embodiment according to any of the previous embodiments, the smaller radius locations include a generally constant inner radius which is smaller than the inner radius at the at least one of the inner and outer platforms, with the generally constant inner radius being utilized along a majority of a radial length of the inner trailing edge.

In another embodiment according to any of the previous embodiments, a ratio of the inner radius at the at least one of the inner and outer platforms to the inner radius at the smaller radius locations is between 1.1 and 6.1.

In another embodiment according to any of the previous embodiments, a seal land is formed on the at least one of the inner and outer platform at a location beyond the trailing edge.

In another embodiment according to any of the previous embodiments, a rib is formed on the at least one of the inner and outer platforms at a location beyond the inner trailing edge.

In another embodiment according to any of the previous embodiments, the vane is canted such that an outer leading edge and an inner leading edge of the airfoil extend at a non-perpendicular angle between the inner and outer platforms.

In another embodiment according to any of the previous embodiments, there are a plurality of distinct inner radii between the inner and outer platforms.

In another featured embodiment, a mid-turbine frame for use in a gas turbine engine has a plurality of vanes including an inner platform and an outer platform. Each vane has an airfoil extending between the inner and outer platforms. The airfoils are hollow and a hollow within the airfoils extends between an inner leading edge to an inner trailing edge. An inner radius is defined at the inner trailing edge in a circumferential direction measured between circumferential walls which define the hollow. The inner radius varies along a radial length defined between the inner and outer platforms.

In another embodiment according to the previous embodiment, the inner radius is greater at the at least one of the inner and the outer platforms than at smaller radius locations disposed in a region defined radially between the inner and outer platforms.

In another embodiment according to any of the previous embodiments, the inner radius is greater at both the inner and outer platforms than it is at the smaller radius locations radially between the inner and outer platforms.

In another embodiment according to any of the previous embodiments, the smaller radius locations include a generally constant inner radius which is smaller than the inner radius at the at least one of the inner and outer platforms, with the generally constant inner radius utilized along a majority of a radial length of the inner trailing edge.

In another embodiment according to any of the previous embodiments, a ratio of the inner radius at the at least one of the inner and outer platforms to the inner radius at the smaller radius locations is between 1.1 and 6.1.

In another embodiment according to any of the previous embodiments, a seal land is formed on the at least one of the inner and outer platform at a location beyond the trailing edge.

In another embodiment according to any of the previous embodiments, a rib is formed on the at least one of the inner and outer platforms at a location beyond the inner trailing edge.

In another embodiment according to any of the previous embodiments, the vane is canted such that an outer leading edge and an inner leading edge of the airfoil extend at a non-perpendicular angle between the inner and outer platforms.

In another embodiment according to any of the previous embodiments, there are a plurality of distinct inner radii between the inner and outer platforms.

In another featured embodiment, a gas turbine engine has a higher pressure turbine rotor and a lower pressure turbine rotor, and a mid-turbine frame positioned between the higher and lower pressure turbine rotors and supporting a bearing. The mid-turbine frame includes an inner platform and an outer platform, and a plurality of vanes each including an airfoil extending between an inner platform and an outer platform. The airfoils are hollow and a hollow within the airfoil extends between an inner leading edge to an inner trailing edge. A first location of the inner leading edge at at least one of the inner platform and the outer platform is spaced by a greater distance from an outer leading edge of the airfoil than is a radially intermediate second location of the inner trailing edge.

In another embodiment according to the previous embodiment, an inner radius is defined at the inner trailing edge in a circumferential direction measured between circumferential walls which define the hollow. The inner radius varies along a radial length defined between the inner and outer platforms to provide the different distances at the first and second locations.

In another embodiment according to any of the previous embodiments, the inner radius is greater at the at least one of the inner and the outer platforms than at smaller radius locations disposed in a region radially between the inner and outer platforms.

In another embodiment according to any of the previous embodiments, the inner radius is greater at both the inner and outer platforms than it is at the smaller radius locations radially between the inner and outer platforms.

In another embodiment according to any of the previous embodiments, the smaller radius locations include a generally constant inner radius which is smaller than the inner radius at the at least one of the inner and outer platforms, with the generally constant inner radius being utilized along a majority of a radial length of the inner trailing edge.

In another embodiment according to any of the previous embodiments, a ratio of the inner radius at the at least one of the inner and outer platforms to the inner radius at the smaller radius locations is between 1.1 and 6.1.

In another embodiment according to any of the previous embodiments, a seal land is formed on the at least one of the inner and outer platform at a location disposed in a region defined beyond the trailing edge.

In another embodiment according to any of the previous embodiments, the vane is canted such that an outer leading edge and an inner leading edge of the airfoil extend at a non-perpendicular angle between the inner and outer platforms.

In another embodiment according to any of the previous embodiments, there are a plurality of distinct inner radii between the inner and outer platforms.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

These and other features may be best understood from the following drawings and specification.

DETAILED DESCRIPTION

Figure 1A:
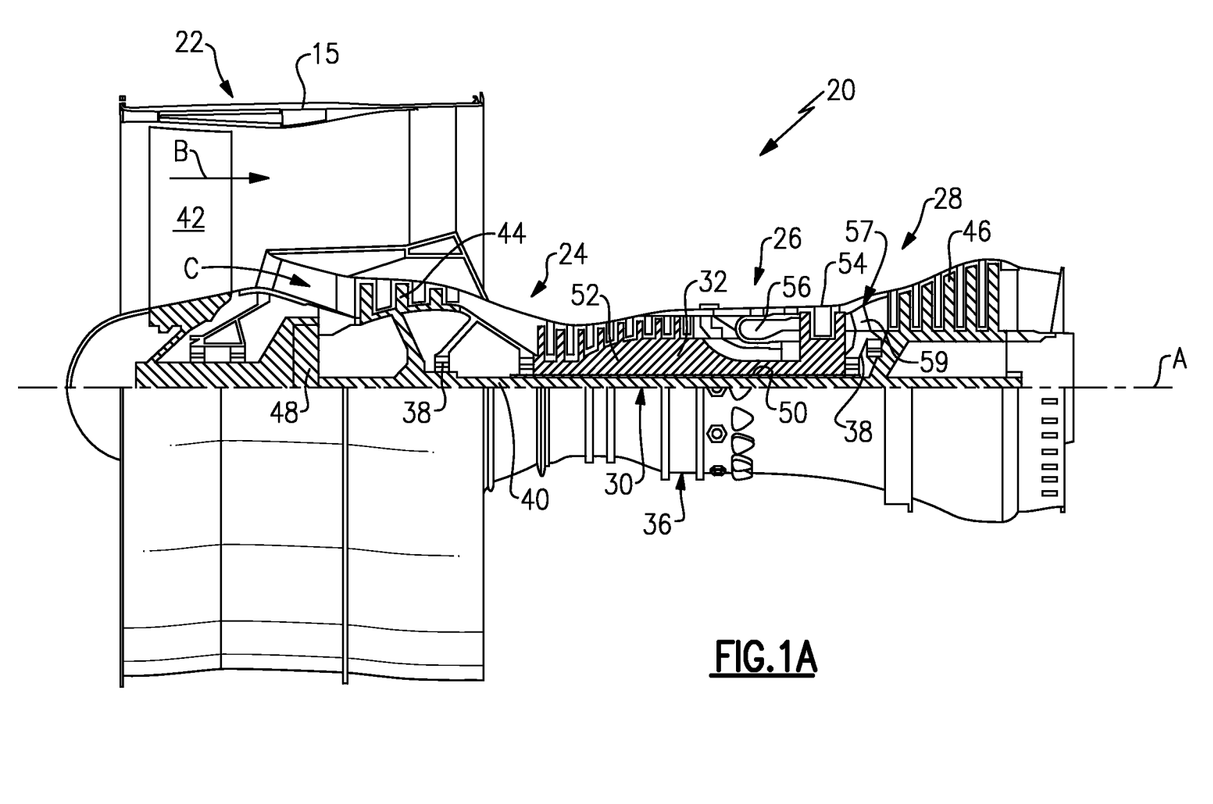
FIG. 1A shows a gas turbine engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes. For embodiments of the engine 20 with three-spools, not shown in FIG. 1A, multiple mid-turbine frames 57 may exist between, for example, a high spool and an intermediate spool and an intermediate spool and a low spool. One of ordinary skill in the art may apply the various embodiments disclosed herein to multiple such inter-spool locations found in various configuration engines 20.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ ° R)/(518.7° R)]^{0.5}$. The "Low corrected fan tip speed" as disclosed herein according to one non-limiting embodiment is less than about 1150 ft/second.

Figure 1B:
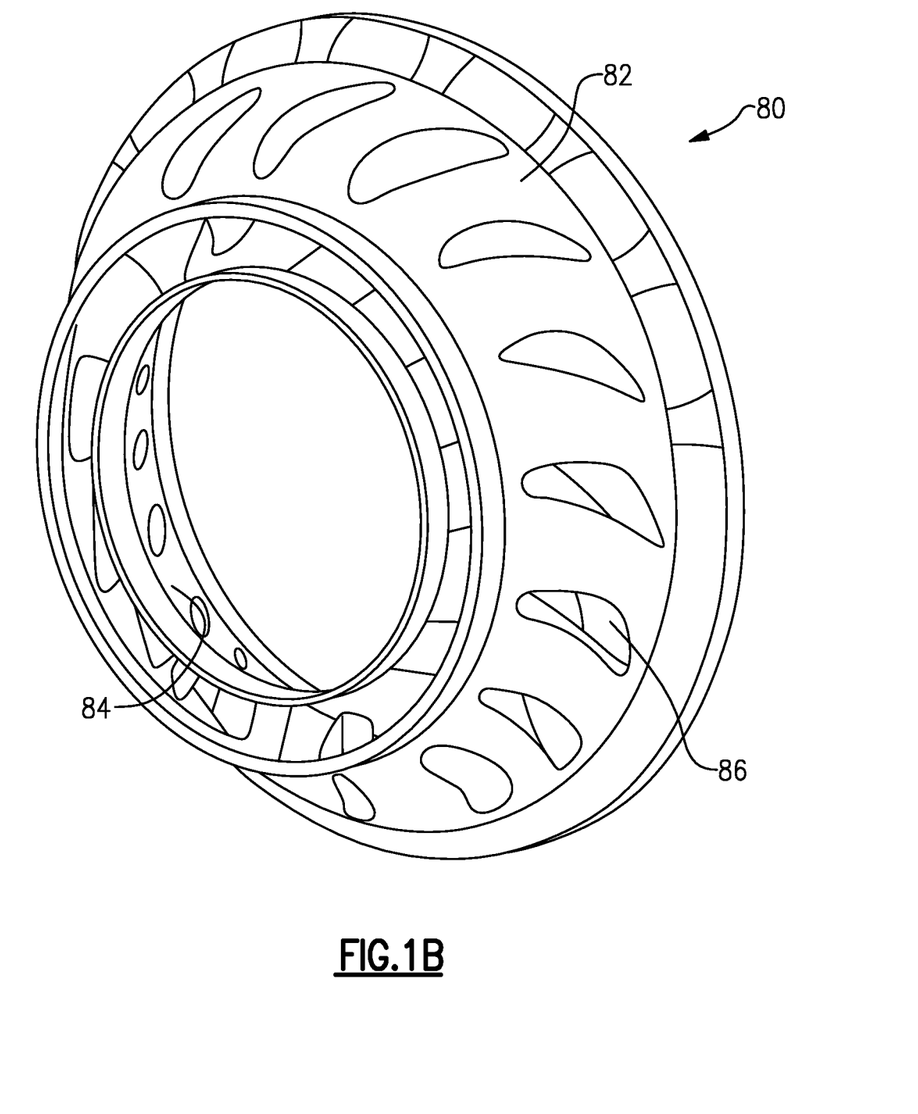
FIG. 1B shows a mid-turbine frame incorporated into the FIG. 1A gas turbine engine.

FIG. 1B illustrates a mid-turbine frame 80 which may be incorporated into the gas turbine engine 20. That is, mid-turbine frame 80 may be used at the location of mid-turbine frame 57, and support bearings 38. An outer platform 82 is spaced from an inner platform 84. Airfoils 86 extend between the inner platform 84 and outer platform 82. The airfoils 86 can be seen to be hollow.

Figure 1C:
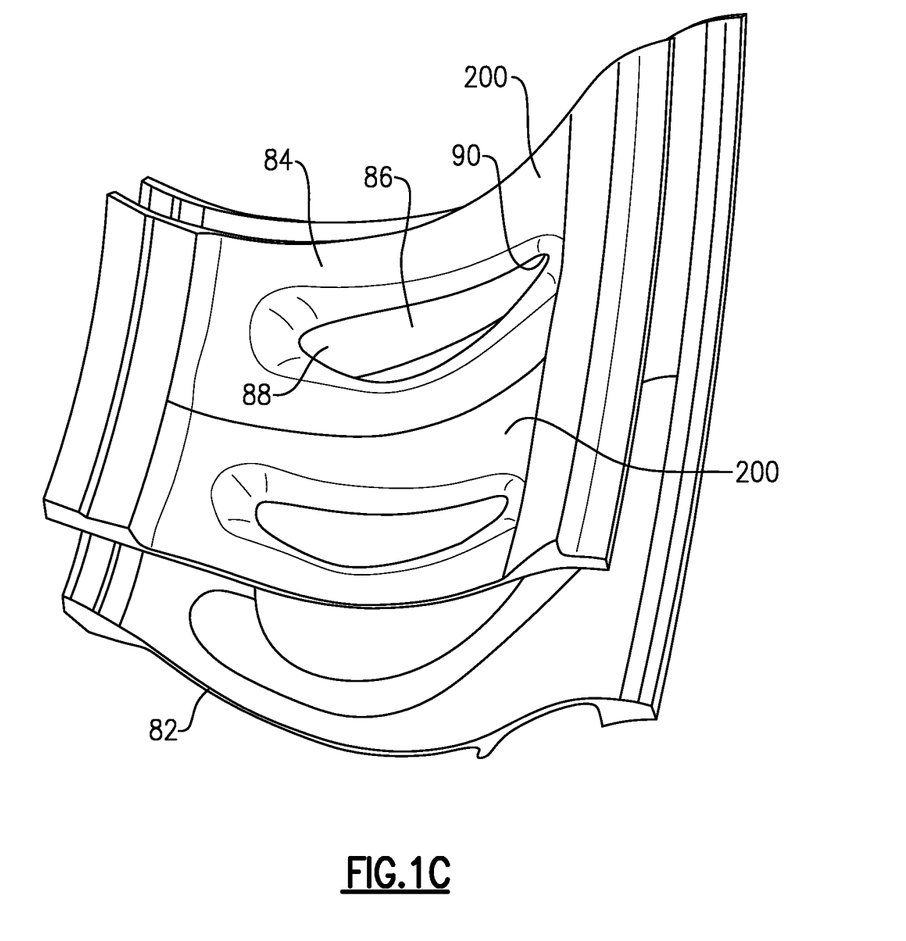
FIG. 1C shows a detail of a vane.

FIG. 1C shows a detail of vanes 200. A vane 200 is defined to include an airfoil 86 and a portion of platform 82 and 84. As shown in FIG. 1C, the vanes 200 are segmented. While FIG. 1C shows two vanes connected together resulting in a repeating unit comprising two vanes 200. In other embodiments, the number of vanes 200 present in a single repeating unit may vary from one to multiple vanes. The repeating units are assembled axially about the centerline of the engine 20 for form a generally circumferential structure. In this manner the mid-turbine frame 80 is formed by mating multiple repeating units including one or more vanes 200 together such as shown in FIG. 1B. On the other hand, in a disclosed embodiment, the mid-turbine frame 80 is cast as a single part.

Figure 2A:
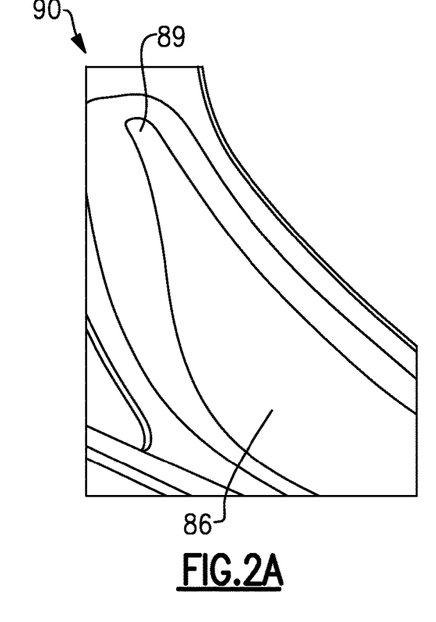
FIG. 2A shows a first possible trailing edge inner radius.

As shown in FIG. 2A, an inner radius 89 at the trailing edge 90 is relatively small. Alternatively, FIG. 2B shows a larger trailing edge radius 190.

Figure 2B:
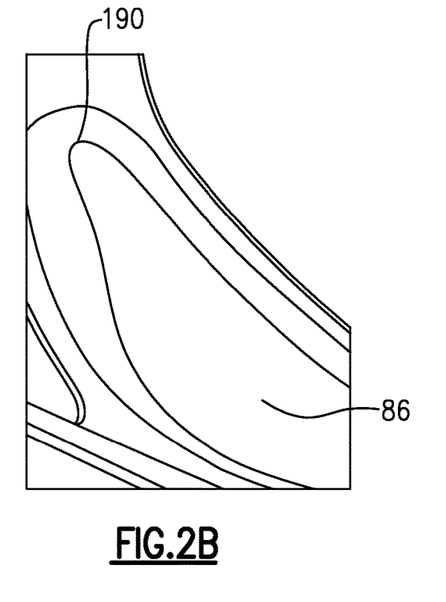
FIG. 2B shows an alternative trailing edge inner radius.
Figure 2C:
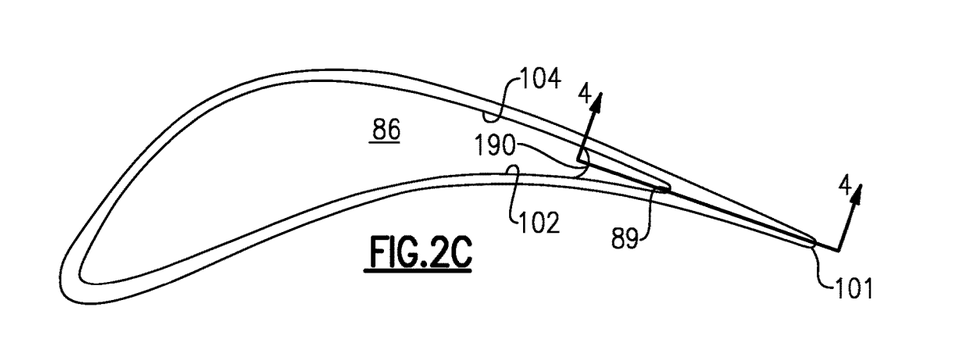
FIG. 2C shows a detail of the difference between the FIGS. 2A and 2B alternatives.

FIG. 2C shows a difference in the amount of material between the FIG. 2B radius 190 and the FIG. 2A radius 89.

Figure 2D:
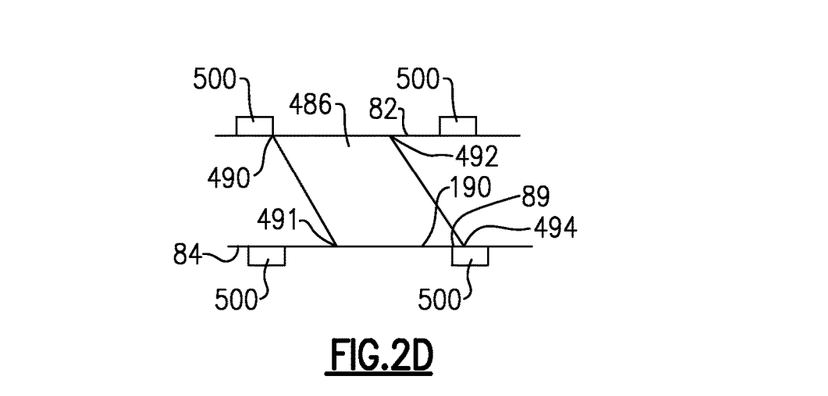
FIG. 2D shows an alternative embodiment.

FIG. 2D schematically shows another vane embodiment 486 that would raise concerns with regard to having an unduly small radius at the platforms. Vane 486 is canted, meaning that an outer end of the leading edge at 490 is spaced further forwardly than an inner end 491. This results in the outer trailing edge 492 also being spaced forwardly relative to the inner trailing edge 494. Stated another way, the leading edge and the trailing edge extend from the platforms at a non-perpendicular angle.

Seals 500 (shown schematically) are positioned on both of the platforms 82 and 84. The seals 500 must not close off the hollow within the airfoil 486. As shown, somewhat schematically, should the radius 89 as illustrated in FIG. 2C be used, rather than the radius 190, the seal 500 at the rear radially inner end could block a portion of the hollow. This would be undesirable. This provides another reason why having a larger radius at one of the platforms might be beneficial.

Figure 3A:
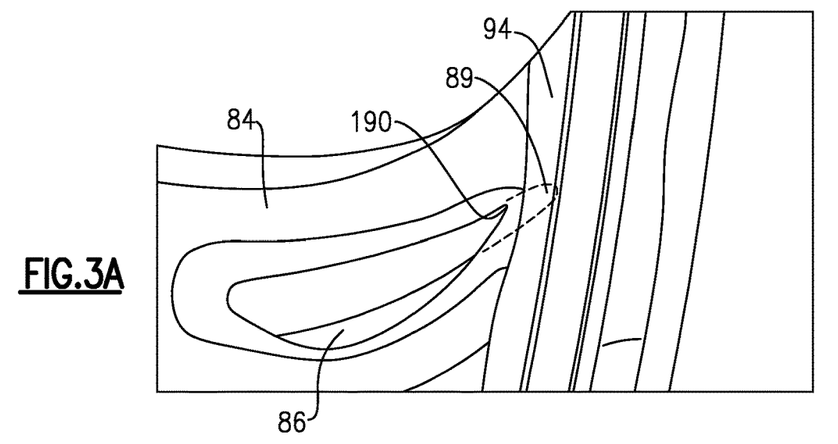
FIG. 3A shows a design challenge.

FIG. 3A shows that the trailing edge inner radius 190 would end before the trailing edge inner radius 89. If the trailing edge inner radius 89 were used at the inner platform 84, it would extend across a seal land 94. Thus, the larger radius 190 would be desirable at the inner platform 84.

Figure 3B:
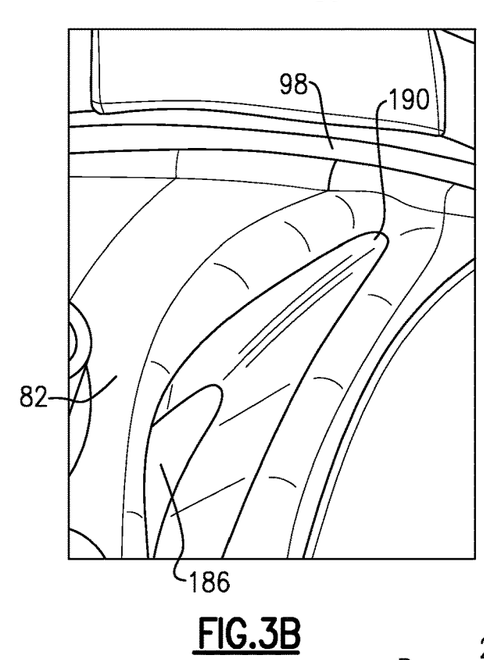
FIG. 3B shows another design challenge.

Similarly, a rib 98, shown on FIG. 3B, is formed on the outer platform 82 and the trailing edge larger inner radius 190 would end before crossing the rib 98.

However, as can be appreciated from FIG. 2C, utilizing the larger radius 190 would result in additional material. The additional material is not necessary along a radial length within the vanes 86, between the platforms 82 and 84.

Figure 4A:
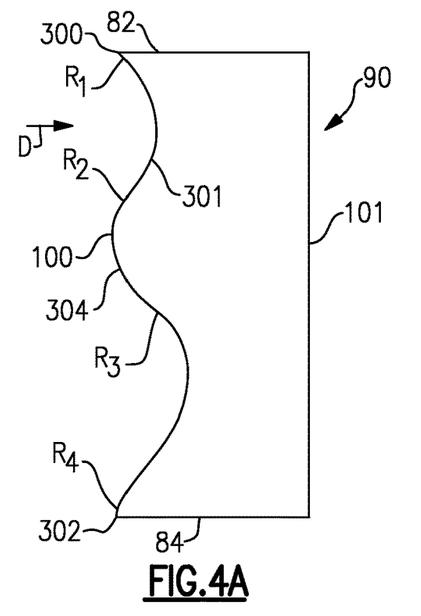
FIG. 4A illustrates a cross-section along line 4-4 of FIG. 2C.

Thus, FIG. 4A shows a variable radius along a radial direction of an inner surface 100 of a trailing edge 90. A radius $R_1$ may be utilized at the outer platform 82 and merged into a radius $R_2$ which extends for the bulk of the radial length of the trailing edge surface 100. A transition radius $R_3$ may be utilized to transition into a radius $R_4$ that would extend to the inner platform 84. It should be understood that the radii $R_1$-$R_4$ are defined into the plane of FIG. 4. That is, they are measured in a direction that will be generally circumferential and between the walls 102 and 104 of the vane 86, as shown in FIG. 2C.

FIG. 4A shows an outer wall 101 at the outer trailing edge of the airfoil 86. As can be appreciated from FIG. 4, this outer surface is more constant than is the inner surface 100. On the other hand, the outer surface may vary.

In embodiments, $R_1$ and $R_4$ may be significantly larger than $R_2$. As an example, $R_1$ and $R_4$ could be 0.156 inch (about 0.2286 centimeter), while $R_2$ could be 0.030 inch (about 0.1016 centimeter). In embodiments, a ratio of $R_1$ or $R_4$ to $R_2$ can be between 1.1 and 6.1. Again, $R_2$ may extend for the majority of the radial length of the surface 100.

In embodiments, any number variations in the radii can be utilized, As an example, a small radius could be used at the outer diameter, with a small transition radius, and then a large inner diameter radius. Further, as disclosed above, the outer radius could be large, with the internal radius being small, and the inner radius being large. Further, the outer radius could be large, with the internal radius being large, and the inner radius being small. Any number of combinations of the several radii may be appropriate for a particular application.

As shown in FIG. 4A, points 300 and 302 of the surface 100 at the platforms 82 and 84 may be spaced further upstream in a direction of flow D than are intermediate portions, such as shown at 301. Stated another way, the radially intermediate portion 301 may be closer to the outer wall 101 than are outer portions 300 and 302.

FIG. 4A is an example to show the power of the disclosed features, and illustrate various possibilities. As an example, a radially central bulge 304 has a greater radius than does the portion 301.

Figure 4B:
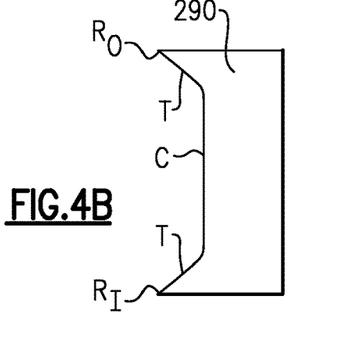
FIG. 4B shows an alternative embodiment.

In practice, FIG. 4B may show a more likely embodiment 290 wherein there is a greater radius $R_O$ at the radially outer portion, with transition radii T blending into a constant radius C that merges into another transitional radii T, and finally a greater radius $R_I$ at the inner end. The constant radius C may extend for the majority of the radial length of the vane 290.

The ability to utilize a variable radius along the length will eliminate material, and thus provide a weight savings, while still addressing stress and other physical issues as outlined above. In one example, a weight savings of as much as one pound can be achieved utilizing the variable radius.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A turbine vane comprising:
    an airfoil extending between an inner platform and an outer platform, said airfoil being hollow and a hollow within said airfoil extending between an inner leading edge to an inner trailing edge;
    an inner radius defined at said inner trailing edge in a circumferential direction measured between walls which extend from said inner leading edge to said inner trailing edge, and said inner radius varying along a radial length defined between said inner and outer platforms; and
    wherein said inner radius is greater in at least one of said inner and said outer platforms than at smaller radius locations disposed in a region defined radially between said inner and outer platforms; and
    wherein said inner radius is greater at both said inner and outer platforms than it is at said smaller radius locations.

2. The turbine vane as set forth in claim 1, wherein said smaller radius locations include a generally constant inner radius which is smaller than said inner radius at said at least one of said inner and outer platforms, with said generally constant inner radius being utilized along a majority of a radial length of said inner trailing edge.

3. The turbine vane as set forth in claim 1, wherein a ratio of said inner radius at said at least one of said inner radius inner and outer platforms to said inner radius at said smaller radius locations being between 1.1 and 6.1.

4. The turbine vane as set forth in claim 1, wherein a seal land is formed on said at least one of said inner and outer platform at a location beyond said trailing edge.

5. The turbine vane as set forth in claim 1, wherein a rib is formed on said at least one of said inner and outer platforms at a location beyond said inner trailing edge.

6. The turbine vane as set forth in claim 1, wherein said vane is canted such that an outer leading edge and an inner leading edge of said airfoil extend at a non-perpendicular angle between said inner and outer platforms.

7. The turbine vane as set forth in claim 1, wherein there are a plurality of distinct inner radii between said inner and outer platforms.

8. The turbine vane as set forth in claim 1, wherein points on the inner surface adjacent to said inner and outer platforms are spaced further upstream in a direction of flow than is at least one radially intermediate portion, and there being an outer wall, with said at least one radially intermediate portion being closer to said outer wall than said points adjacent to said inner and outer platforms.

9. A mid-turbine frame for use in a gas turbine engine comprising:
    a plurality of vanes including an inner platform and an outer platform, and each vane having an airfoil extending between said inner and outer platforms;
    said airfoils being hollow and a hollow within said airfoils extending between an inner leading edge to an inner trailing edge, an inner radius defined at said inner trailing edge in a circumferential direction measured between circumferential walls which define the hollow, and said inner radius varying along a radial length defined between said inner and outer platforms;
    wherein said inner radius is greater in at least one of said inner and said outer platforms than at smaller radius locations disposed in a region defined radially between said inner and outer platforms; and
    wherein said inner radius is greater at both said inner and outer platforms than it is at said smaller radius locations radially between said inner and outer platforms.

10. The mid-turbine frame for use in a gas turbine engine as set forth in claim 9, wherein said smaller radius locations include a generally constant inner radius which is smaller than said inner radius at said at least one of said inner and outer platforms, with said generally constant inner radius being utilized along a majority of a radial length of said inner trailing edge.

11. The mid-turbine frame for use in a gas turbine engine as set forth in claim 9, wherein a ratio of said inner radius at said at least one of said inner and outer platforms to said inner radius at said smaller radius locations being between 1.1 and 6.1.

12. The mid-turbine frame for use in a gas turbine engine as set forth in claim 9, wherein a seal land is formed on said at least one of said inner and outer platform at a location beyond said trailing edge.

13. The mid-turbine frame for use in a gas turbine engine as set forth in claim 9, wherein a rib is formed on said at least one of said inner and outer platforms at a location beyond said inner trailing edge.

14. The mid-turbine frame as set forth in claim 9, wherein said vane is canted such that an outer leading edge and an inner leading edge of said airfoil extend at a non-perpendicular angle between said inner and outer platforms.

15. The mid-turbine frame as set forth in claim 9, wherein there are a plurality of distinct inner radii between said inner and outer platforms.

16. The mid-turbine frame for use in a gas turbine engine as set forth in claim 9, wherein points on the inner surface adjacent to said inner and outer platforms are spaced further upstream in a direction of flow than is at least one radially intermediate portion, and there being an outer wall, with said at least one radially intermediate portion being closer to said outer wall than said points adjacent to said inner and outer platforms.

17. A gas turbine engine comprising:
a higher pressure turbine rotor and a lower pressure turbine rotor, and a mid-turbine frame positioned between said higher and lower pressure turbine rotors and supporting a bearing;
the mid-turbine frame including an inner platform and an outer platform, and a plurality of vanes each including an airfoil extending between an inner platform and an outer platform;
said airfoils being hollow and a hollow within said airfoil extending between an inner leading edge to an inner trailing edge, a first location of said inner leading edge at least one of said inner platform and said outer platform being spaced by a greater distance from an outer leading edge of said airfoil than is a radially intermediate second location of said inner trailing edge;
wherein an inner radius is defined at said inner trailing edge in a circumferential directions measured between circumferential walls which define the hollow, and said inner radius varying along a radial length defined between said inner and outer platforms to provide the different distances at said first and second locations;
wherein said inner radius is greater in at least one of said inner and said outer platforms than at smaller radius locations disposed in a region defined radially between said inner and outer platforms; and
wherein said inner radius is greater at both said inner and outer platforms than it is at said smaller radius locations radially between said inner and outer platforms.

18. The gas turbine engine as set forth in claim 17, wherein said smaller radius locations include a generally constant inner radius which is smaller than said inner radius at said at least one of said inner and outer platforms, with said generally constant inner radius being utilized along a majority of a radial length of said inner trailing edge.

19. The gas turbine engine as set forth in claim 17, wherein a ratio of said inner radius at said at least one of said inner and outer platforms to said inner radius at said smaller radius locations being between 1.1 and 6.1.

20. The gas turbine engine as set forth in claim 17, wherein a seal land is formed on said at least one of said inner and outer platform at a location disposed in a region defined beyond said trailing edge.

21. The gas turbine engine as set forth in claim 17, wherein said vane is canted such that an outer leading edge and an inner leading edge of said airfoil extend at a non-perpendicular angle between said inner and outer platforms.

22. The gas turbine engine as set forth in claim 17, wherein there are a plurality of distinct inner radii between said inner and outer platforms.

23. The gas turbine engine as set forth in claim 17, wherein points on the inner surface adjacent to said inner and outer platforms are spaced further upstream in a direction of flow than is at least one radially intermediate portion, and there being an outer wall, with said at least one radially intermediate portion being closer to said outer wall than said points adjacent to said inner and outer platforms.

* * * * *